ABER
UNITED STATES PATENT OFFICE.

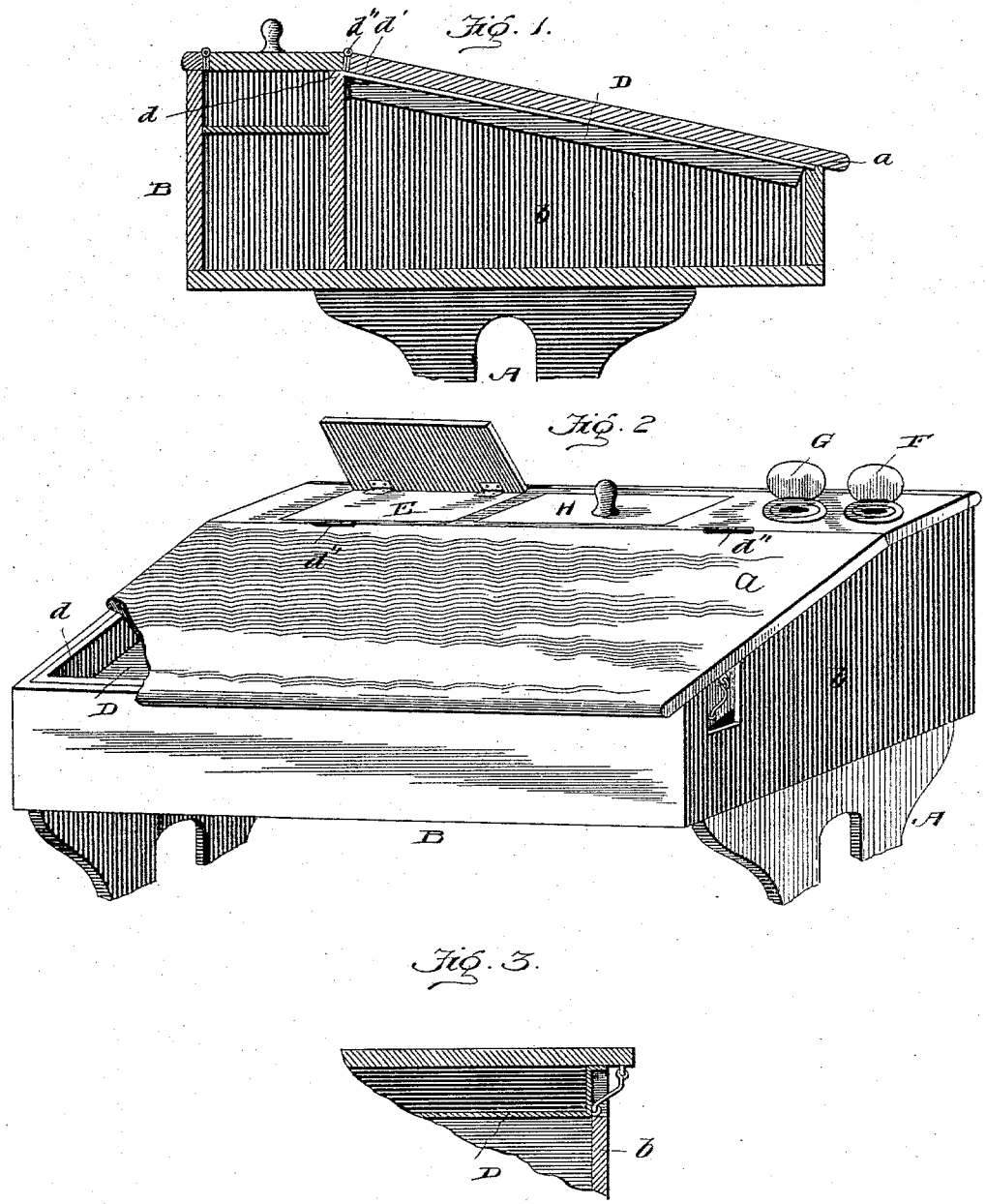

ZONIA BABER, OF CHICAGO, ILLINOIS.

SCHOOL-DESK.

SPECIFICATION forming part of Letters Patent No. 563,638, dated July 7, 1896.

Application filed February 19, 1896. Serial No. 579,853. (No model.)

*To all whom it may concern:*

Be it known that I, ZONIA BABER, a citizen of the United States, residing in the city of Chicago, in the county of Cook and State of Illinois, have invented a new and useful Improvement in School-Desks, of which the following is a specification.

My invention relates to the construction of a desk-top of that kind wherein trays and compartments are provided, and the object of my invention is to provide a desk for such schools where geography and kindred sciences are taught objectively by advanced methods which shall answer all the purposes of an ordinary school-desk, and which shall at the same time meet the requirements of these advanced methods, which thus far are supplied by the use of trays and vessels apart from and constituting no part of the desk. I attain this object by the mechanism illustrated in the accompanying drawings, in which—

Figure 1 represents a vertical cross-section of the desk-top B. Fig. 2 represents a perspective view of the desk-top B with the lid $a$ partly cut away. Fig. 3 is a detail sectional view showing a suitable form of catch for connecting the tray to the cover.

Similar letters refer to similar parts throughout the several views.

In my drawings, A represents the frame of an ordinary desk, upon which the top B rests, securely fastened thereto. The top B is preferably of the shape as illustrated in my drawings and consists of box $b$ and the lid $a$. The lid $a$ is preferably hinged to the box, as illustrated at $d''$ in my drawings, but if deemed more advantageous it may be hinged sidewise, or it may be made so as to slide in grooves instead of being hinged, so that the two sides of the lid may be reversibly used for the top side. The inside rim of the box $b$ is slightly depressed.

D is a dish or pan made of galvanized iron or similar suitable material. It is provided with an outer rim $d$, and of such size that it will so fit into the box $b$ that the rim $d$ of this pan will rest upon and fit into the depressed inner rim of the box $b$, so that the tops of box $b$ and pan D are of the same height. The pan D is preferably only from one to two inches deep, whereas the box $b$ has preferably a considerably greater depth. The pan D is so constructed and placed as to be readily lifted out of the box $b$, or, if thought desirable, it may be hinged at $d'$ to the lid $a$, so that the lid may be raised without disturbing the pan, and, on the other hand, the pan may be hinged at one edge to the cover and be connected thereto by suitable hooks or other attaching devices, as at $b''$ in Fig. 1, to make the pan $b$ capable of being raised out of the box with the lid or cover. The top B of my desk, back of the lid $a$, is provided with a receptacle for clay for molding purposes, designated in my drawings by the letter E, and preferably of the shape as therein indicated. It is further provided with an ink-well F, a water-well G, and a receptacle H for pens and pencils.

By the construction described in the foregoing I have endeavored to provide a desk for use in schools wherein a pan, which when in use is filled with sand, becomes a part of the desk, and thus, being always on hand and ready for use, thereby avoids the inconvenience and delay necessarily growing out of the supplying of classes in schools with this article when not so supplied.

What I claim as my invention, and desire to secure by Letters Patent, is—

In a desk, the box-like top B having a seat or ledge in its upper edge, combined with a hinged cover $a$ arranged to close down upon the top and thereby close the same, and a flanged tray D arranged to fit within the box-like top and rest upon the seat or ledge thereon, one edge of said tray being hinged to the cover and said tray having devices for attaching the same to the cover, whereby the tray may be raised with the cover, as set forth.

ZONIA BABER.

Witnesses:
ANNE E. ALLEN,
C. E. EGGERT.